(12) United States Patent
Sharp et al.

(10) Patent No.: US 11,155,414 B2
(45) Date of Patent: Oct. 26, 2021

(54) REBAR CAGE ASSEMBLY MACHINE

(71) Applicant: PJ'S REBAR INC., Fremont, CA (US)

(72) Inventors: Charles Sharp, Pleasanton, CA (US); Alan Ahler, Modesto, CA (US); Rick Carlyle Jr., Ceres, CA (US); Rafael Galvan-Camargo, Stockton, CA (US)

(73) Assignee: PJ's Rebar Inc., Fremont, CA (US)

( * ) Notice: Subject to any disclaimer, the term of this patent is extended or adjusted under 35 U.S.C. 154(b) by 0 days.

(21) Appl. No.: 16/736,369

(22) Filed: Jan. 7, 2020

(65) Prior Publication Data

US 2021/0206575 A1    Jul. 8, 2021

(51) Int. Cl.
| | |
|---|---|
| *B65G 13/11* | (2006.01) |
| *B65G 35/06* | (2006.01) |
| *B65G 13/07* | (2006.01) |
| *E04C 5/06* | (2006.01) |

(52) U.S. Cl.
CPC ............ *B65G 13/11* (2013.01); *E04C 5/0622* (2013.01)

(58) Field of Classification Search
None
See application file for complete search history.

(56) References Cited

U.S. PATENT DOCUMENTS

| | | | | |
|---|---|---|---|---|
| 6,944,951 | B2 * | 9/2005 | Barden | ................ B21F 27/124 |
| | | | | 29/897.34 |
| 7,938,248 | B2 * | 5/2011 | Krups | .................... B65G 35/06 |
| | | | | 198/465.1 |
| 9,096,383 | B2 * | 8/2015 | Rhodes | ................ B65G 23/44 |
| 9,981,810 | B2 * | 5/2018 | Dugat | .................... B65G 21/12 |
| 10,654,091 | B2 * | 5/2020 | Stevens | ................ B21F 27/124 |

* cited by examiner

*Primary Examiner* — Kavel Singh
(74) *Attorney, Agent, or Firm* — Gardner Groff & Greenwald, PC

(57) ABSTRACT

A machine for assembling rebar cages includes a support frame, axial rollers mounted to the support frame for rotatably supporting a cylindrical wire cage for axial rotation about an axis of elongation, a carriage movably mounted to the support frame for translation, with the carriage adapted for driving an elongate rebar rod in a first axial direction. A drive mechanism is mounted to the support frame for driving the carriage in translation back and forth between a retracted position and an extended position for driving rebar rods into the rebar cages for assembly.

11 Claims, 11 Drawing Sheets

REBAR CAGE ASSEMBLY MACHINE

BACKGROUND

Rebar cages are typically used to reinforce concrete and masonry buildings and structures. Rebar is a steel reinforcing element, often in bar or rod form. While materials like concrete have high compression strength, they typically suffer from relatively weak tensile strength. Therefore, rebar cages are used to reinforce concrete and masonry structures to increase the tensile strength when required.

Today, rebar cages are commonly used to reinforce structures of a wide variety of sizes. As such, there are applications where rebar cages of considerable dimensions are required. For example, a foundation pillar of a high-rise building may require a rebar cage of more than 50 feet in length and 6 feet in diameter. Construction or assembly of such rebar cages can be difficult and labor intensive because it requires direct handling of heavy, oversized rebar rods and wire loops. In particular, it is common for a worker or workers to carry a small number of rebar rods (often 1 to 3) from an inventory to and into the interior of a rebar cage. In the case of large diameter, long cages, the labor involved in manually transporting a large number of rebar rods and inserting them into the cage can be substantially.

The present invention relates to a rebar cage assembly machine to minimize the effort and direct handling of materials required in manufacturing rebar cages. The present invention makes the construction of rebar cages easier, quicker, and less expensive.

SUMMARY OF THE INVENTION

Briefly described, in a first preferred example form the present invention relates to a machine or apparatus for assisting workers in assembling rebar cages. In particular, it is useful for helping to complete partially-assembled rebar cages.

In the first example form, an apparatus is provided for assembling rebar cages, and includes a support frame and axial rollers mounted to the support frame for rotatably supporting a cylindrical wire cage for axial rotation about an axis of elongation. A carriage is movably mounted to the support frame for translation to and fro, with the carriage being adapted for driving an elongate rebar rod in a first axial direction. A drive mechanism is mounted to the support frame for driving the carriage in translation back and forth between a retracted position and an extended position and in so doing, driving a rebar rod into the rebar cage.

Preferably, a control element is provided for controlling operation of the drive mechanism, and the apparatus is operative to allow an operator or worker to load an elongate rebar rod with the carriage in its retracted position, to allow the operator or worker to rotate the wire cage to a position to allow a rebar rod to be inserted through one or more of the wire loops, and to allow the operator or worker to control the translation of the carriage to cause the elongate rebar rod to be inserted through the one or more loops and into the wire cage.

Preferably, the drive carriage comprises a receiver portion for capturing an end of the elongate rebar rod. Optionally, the carriage is movably mounted to the support frame by a plurality of longitudinal rollers, with the carriage being carried above the longitudinal rollers.

Optionally, the support frame comprises a first support platform for supporting the wire cage and a second support platform for supporting the carriage. Optionally, the support frame can comprise a single platform.

Optionally, a ramp is provided for lowering the wire cage and a transfer mechanism is provided which is operable for moving the wire cage onto the ramp to allow the wire cage to roll off the apparatus. Preferably, the transfer mechanism includes a cam and a power cylinder for operating the cam to lift the wire cage off of the axial rollers and to urge the wire cage onto the ramp.

Preferably, the support frame includes a shelf for storing a supply of elongate rebar rods for insertion into a wire cage. In one optional form, the drive carriage is driven back and forth by a drive chain and the drive chain is driven by an electric motor.

Optionally, if desired, an alignment element can be provided for aligning the elongate rebar rod to the wire cage. In one form, the alignment element can comprise a funnel-like element movably mounted to the first support frame. In another form, the alignment element can comprise a plurality of rebar guards attached to the second support frame along the path of the carriage and rebar rod. Preferably, the alignment element is hingedly attached to the second support frame to minimize any lateral movement of the rebar rod without hindering or interfering with translational movement of the carriage.

In another example form, the present invention relates to a machine or apparatus for assembling rebar cages and includes a first station comprising a first support frame and a trolley movably supported on the first support frame. The trolley is movably mounted to the first support frame for back and forth translation along the first support frame. A second station is provided and comprises a second support frame and a plurality of axial rollers, wherein the plurality of axial rollers are rotatably mounted to the second support frame and adapted for rotatably supporting a cylindrical wire cage for axial rotation about an axis of elongation. Also, the trolley is adapted for pushing a rebar rod into the cylindrical wire cage.

Preferably, a drive mechanism is provided for driving the carriage in translation back and forth between a retracted position and an extended position. Preferably, the trolley is adapted for receiving and capturing a first end of a rebar rod for translating the rebar rod.

Optionally, the second station further includes a wire cage discharge mechanism comprising an arm hingedly secured to the second support frame and wherein the arm is operated by a first pneumatic cylinder.

Also optionally, the second station can include a braking system for securing the wire cage in place, with the braking system having a frictional element and a second pneumatic cylinder and wherein the frictional element is selectively caused to engage the axial rollers by the second pneumatic cylinder to resist rotation of the axial rollers.

Preferably, a hopper mechanism is provided for loading a rebar rod onto the first station.

Also preferably, the first station further includes one or more alignment elements hingedly attached to the first support frame. The alignment elements are configured to prevent the rebar rod from becoming dislodged from the first station without interfering with the translation of the trolley.

Also preferably, one or more wireless control elements are provided for operating one or more of the braking system, the wire cage discharge system, rotation of the axial rollers, and translation of the trolley.

DETAILED DESCRIPTION OF THE EXAMPLE EMBODIMENTS

Referring now to the drawing figures, in which like numerals refer to like elements throughout the several views, FIGS. 1-10 show particular aspects of a rebar cage assembly apparatus or machine according to example embodiments of the present invention. The machine or apparatus is useful for assisting workers in assembling rebar cages. Among other uses, it is useful for helping to complete partially-assembled rebar cages.

Figure 1:
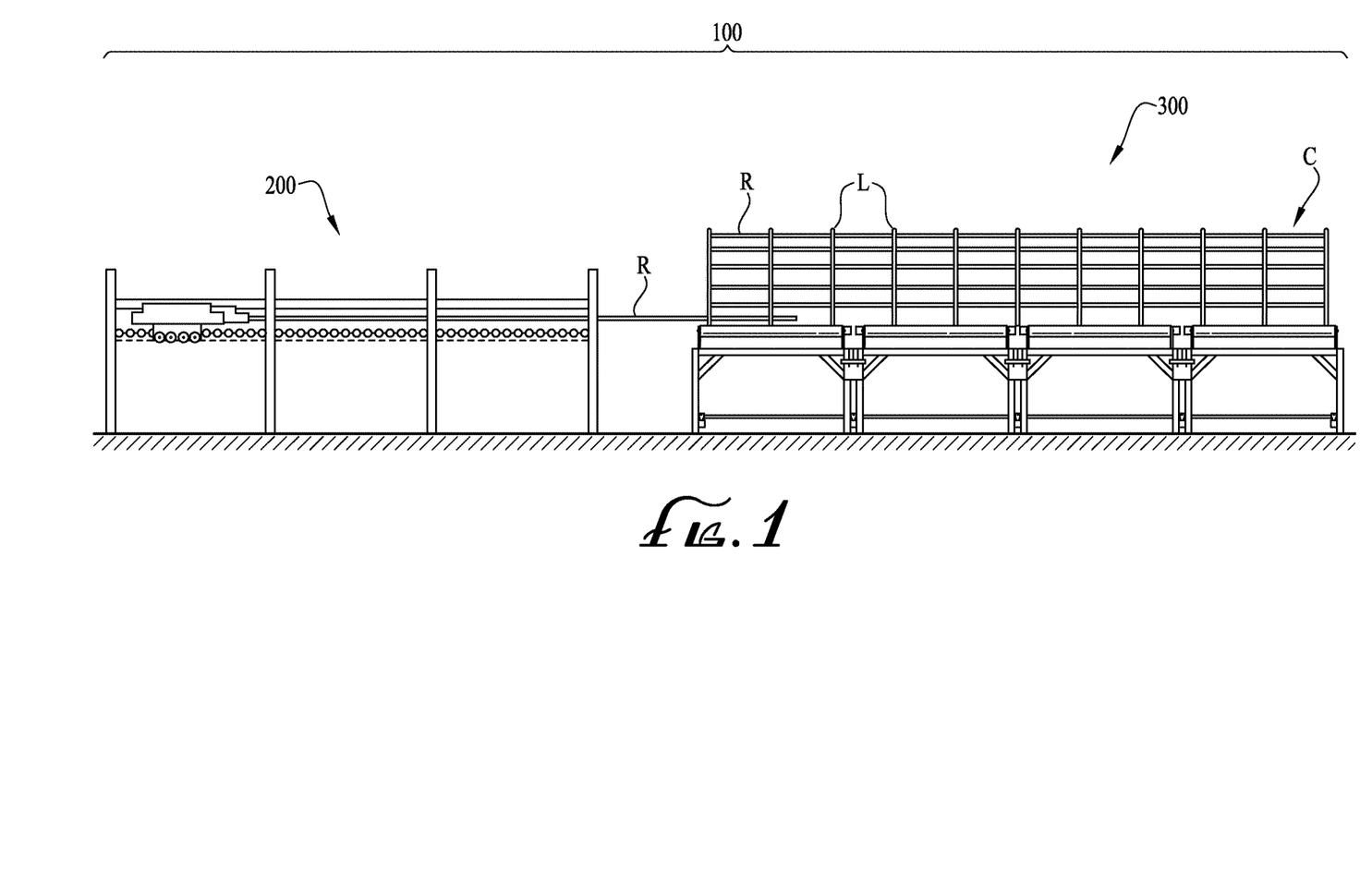
FIG. 1 is a schematic side elevation view of a rebar cage assembly apparatus according to an example form of the present invention.

In a first example form, the present invention relates to a rebar cage assembly machine 100 which generally includes a bar charger table or station 200 and a cage assembly table or station 300, as shown in FIG. 1. The bar charge station and cage assembly station are arranged and used in tandem to assist in the manufacture of rebar cages.

The rebar cage assembly machine 100 allows elongate rebar rods R to be inserted into partially-assembled rebar cages. Such cages can be assembled from individual rings or can be wound (spiral), as desired. The rebar rods R typically are loaded onto the bar charger table 200 either manually or via automated feeder system. Once loaded, an elongate rebar rod R (or many such rebar rods) is longitudinally driven from the bar charger station 200 to the cage assembly station 300 and into a rebar cage. The cage assembly station is generally aligned with the bar charger station 200 to receive the rebar rods discharged from the charger station. Cage assembly station 300 is configured for holding a plurality of circular wire cage loops or spiral sections L aligned to the path of a driven rebar rod. In example forms, the rebar rods R are maneuvered across the cage loops or spiral sections L where the rebar rods are secured to the cage loops or spiral sections with tie-wires or by other securing methods. Typically, the rebar rods are inserted into the cage loops or spiral sections, with the cage loops or spiral sections not yet having wire ties or small loops attached thereto. Instead, the rebar rods are inserted and then wire ties are fastened around the intersections of the rebar rods with the cage loops or spiral sections. It is possible to provide the cage loops or spiral sections with pre-positioned tie-wires or small wire loops or eyelets or small wire rings through which the rebar rods are to be inserted therethrough, but this is not as efficient or practical as inserting the rebar rods into cage loops or spiral sections that don't yet have wire ties attached and then securing them in place, as it simplifies the act of inserting the rebar rods. This is so because otherwise, as a rebar rod R is driven over the cage assembly station 300 and into the cage, it would need to be closely guided and maneuvered through appropriate connection points (the smaller eyelets or small wire rings) located about the perimeter of each wire loop L.

Once one rebar rod is completely driven across the rebar loops and secured thereto, the bar charger station 200 is reloaded with another rebar rod while the unfinished rebar cage C is rotated on its axial axis and repositioned for receiving the next rod. When the rebar cage C is fully assembled, it is removed from the cage assembly station 300 via a discharge or removal mechanism.

Figure 2:
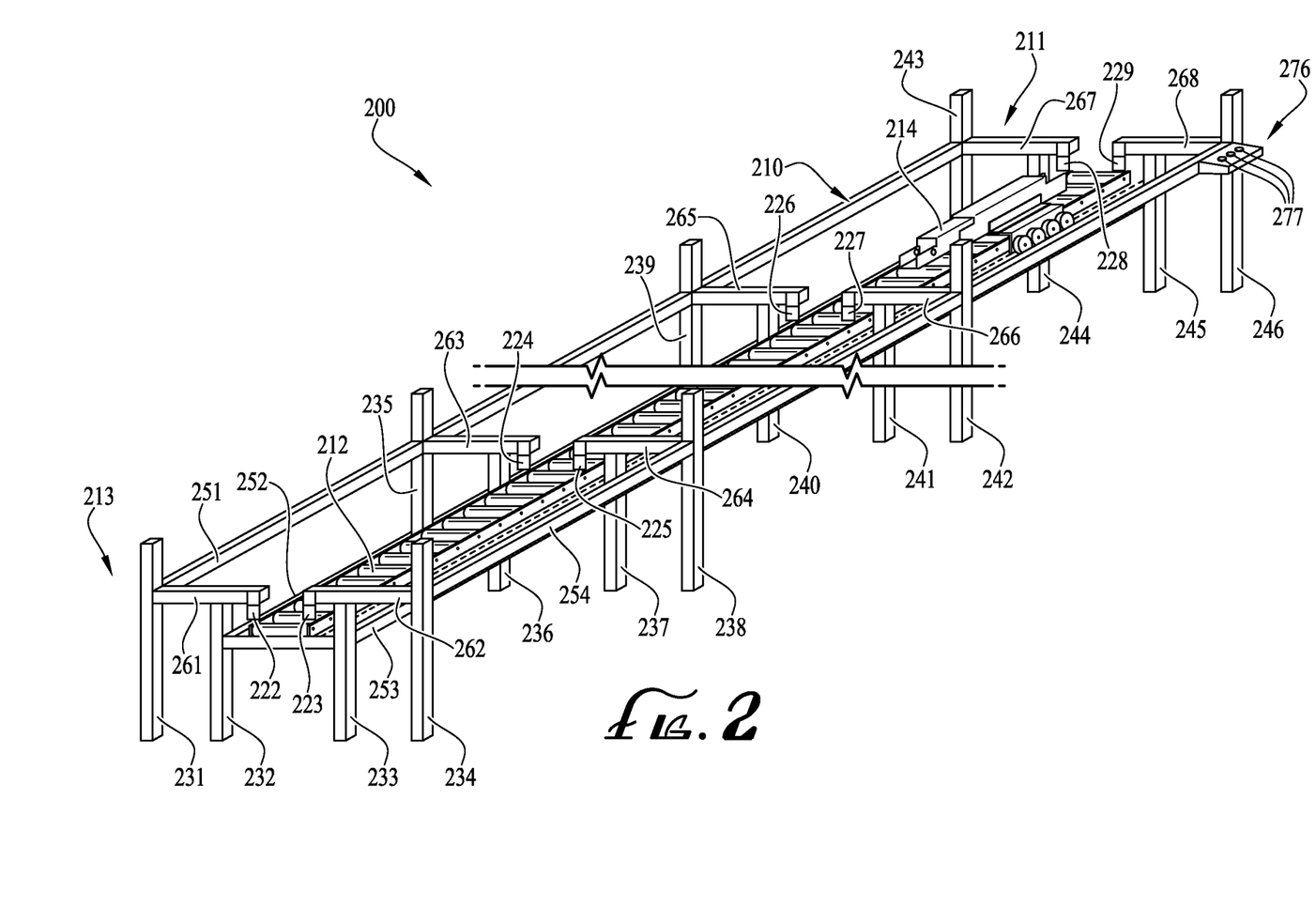
FIG. 2 is a schematic perspective view of a bar charger table portion of the rebar cage assembly apparatus of FIG. 1.
Figure 3:
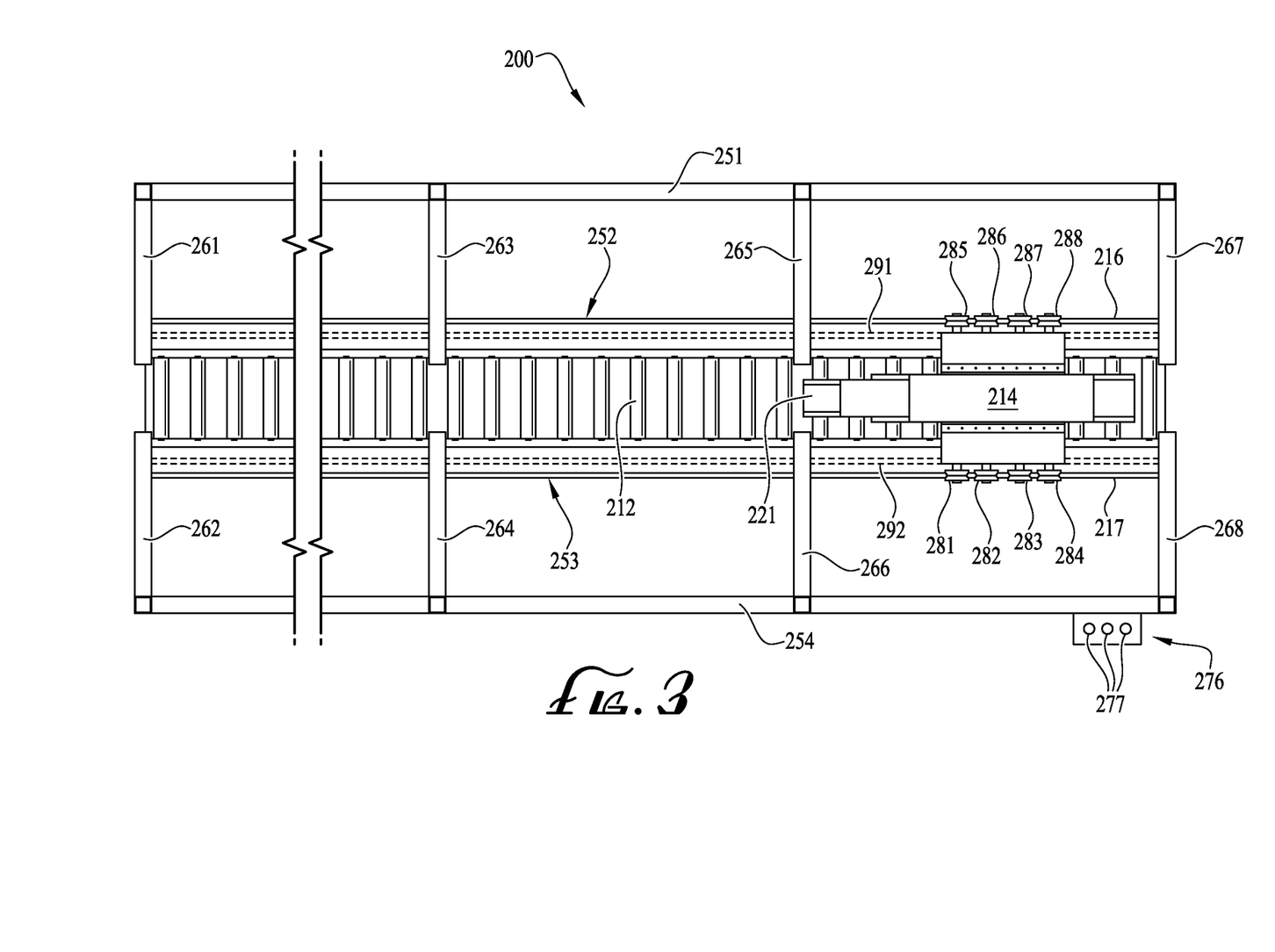
FIG. 3 is a top (plan) view of the bar charger table of FIG. 2.
Figure 4:
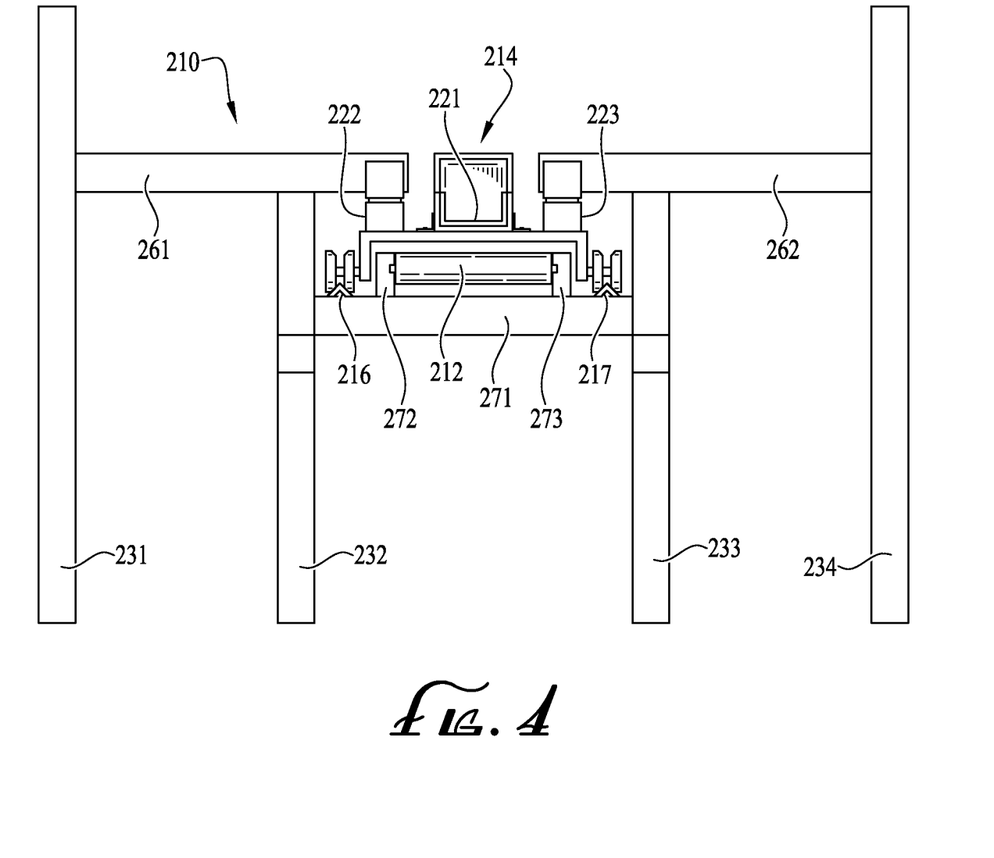
FIG. 4 is a schematic end elevation view of the bar charger table of FIG. 2.

FIGS. 2-4 show a bar charger station or table 200 according to an example form of the present invention. The bar charger table 200 generally comprises a support frame 210 having a first, proximal end 211 and a second, distal end 213. The support frame 210 includes a plurality of support stanchions or legs, such as legs 231-246. The legs 231-246 are attached to and support longitudinal rails 251-254 and transverse rails 261-268. As best seen in FIG. 4, a series of inner transverse rails extends between and connects the inner stanchions or legs, such as inner transverse rail 271 connecting inner legs 232 and 233. Smaller longitudinal rails 272, 273 are carried upon these inner transverse rails 271 and support the rollers, as described below.

The bar charger station 200 further comprises a plurality of longitudinal rollers 212 rotatably mounted to the smaller longitudinal rails 272, 273 of the support frame 210. The plurality of longitudinal rollers 212 form a conveyor or rail on which the rebar rods are moved or driven. A trolley or carriage 214 is generally positioned over the longitudinal rollers 212 for translation between a retracted position adjacent the first, proximal end 211 of the bar charger table 200 and an extended position adjacent the second, distal end 213. The trolley 214 is adapted for driving elongate rebar rods R longitudinally between the retracted and extended positions 211, 213 wherein the elongate rebar rod R is generally loaded or placed onto the bar charger table 200 when the trolley 214 is in its retracted position. The elongate rebar rod is pushed towards the cage assembly table 300 as the trolley 214 is moved from the retracted position to the extended position.

As shown in FIGS. 3 and 4, carriage or trolley 214 has wheels on each side (4 wheels on each side), such as wheels 281-288. The wheels are rotatably mounted to axles extending from the body of the trolley 214. The wheels are each a tandem wheel and adapted to ride on and be guided by inverted angle tracks 216, 217. As best seen in FIG. 4, the inverted angle tracks 216, 217 movably mount the trolley 214 and guide the trolley, thereby generally restricting the motion of the trolley to a back and forth (to and fro) reciprocating translating motion. The inverted angle trolley tracks 216, 217 are provided on the support frame 210 and, in particular, are welded to the inner transverse rails, such as inner transvers rail 271. The inverted angle trolley tracks 216, 217 allow the trolley to be guided over the rollers 212 and the smaller rails 272, 273.

Figure 5:
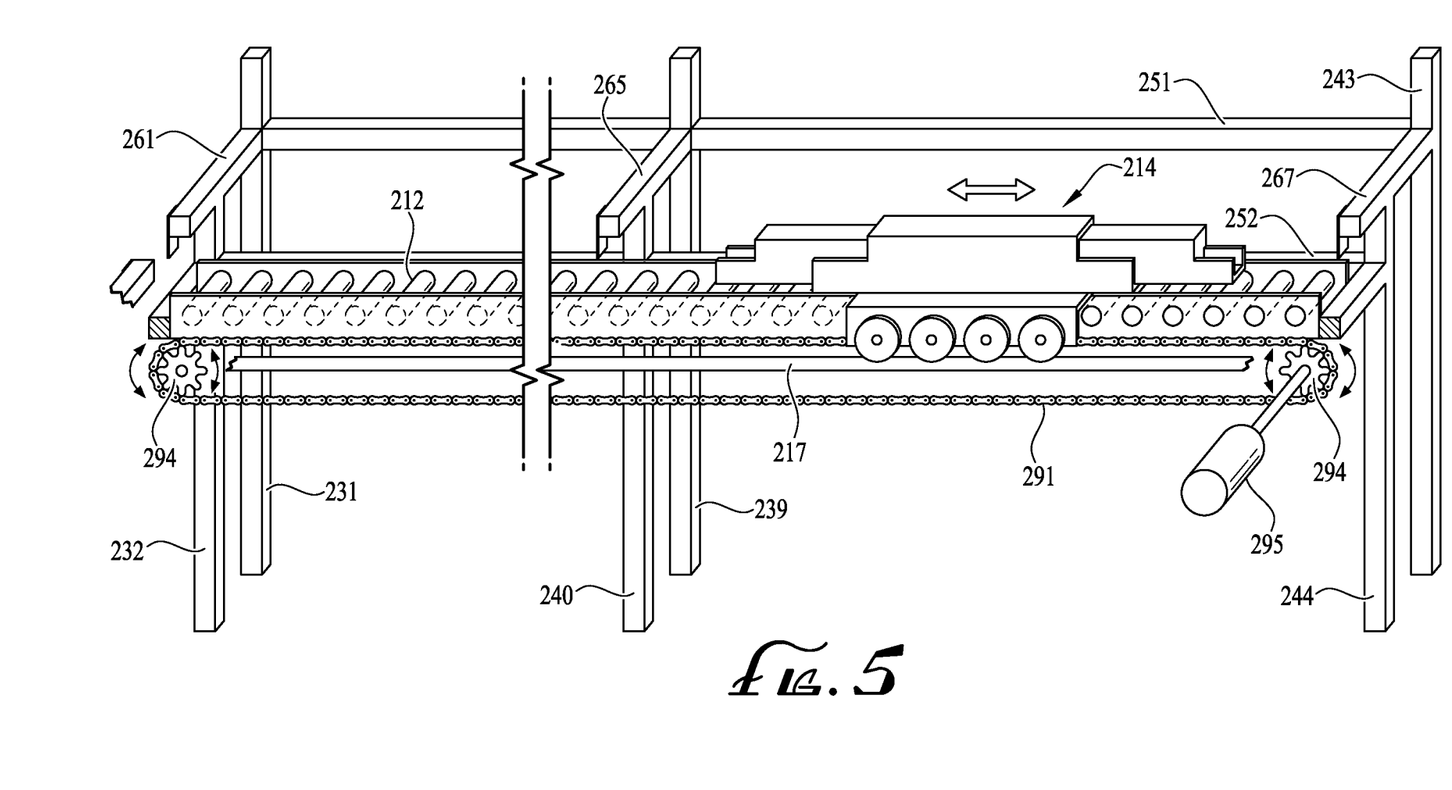
FIG. 5 is a schematic perspective section view of the bar charger table of FIG. 2 showing a drive system.

The trolley is driven by a reciprocating translational trolley drive system 290. The trolley drive system can take many forms. For example, the trolley could be driven by a lead screw. It can also be carried on a chain or cable that is driven back and forth. Indeed, various arrangements are possible. According to one example form, as shown in FIG. 5, carriage or trolley 214 is driven by an endless drive chain 291 (or multiple drive chains 291, 292) which pulls the trolley to and fro as the drive chain is advanced and reversed. The drive chain 291 is driven by one or more drive sprockets 294 and is motivated by an electric motor 295.

The trolley 214 also includes a U-shaped rebar rod receptacle portion or pocket 221 for receiving and/or securing one end of a rebar rod R during the translational driving motion. In other example or optional forms, the trolley 214 can be provided with other features or shapes for capturing and engaging the end of a rebar rod R. For example, a V-shaped receptacle portion can be provided to center each rebar rod on the trolley.

In example forms, rebar rod charger table 200 further includes an electronic control element or mechanism 276 with one or more switches, knobs and/or buttons 277 for controlling the operation of the trolley drive system. The electronic control 276 is operative to allow an operator to load an elongate rebar rod with carriage 214 in its retracted position. The electronic control is also operative to allow the operator to control the translation of carriage 214 across the rebar rod charger table 200. In some forms, the electronic control comprises an emergency stop trigger to stop any translation immediately.

In other example forms, the rebar rod charger table 200 further comprises a shelf or storage platform or loading platform for storing a supply of rebar rods secured to, or otherwise near, the bar charger table 200 thereby reducing the overall effort and time required to reload the bar charger table. The loading platform may be integrated into the bar charger table 200. In some example forms, transverse rails 261-268 may operate as the loading platform. Alternatively, the loading platform can be a discrete component removably secured or placed next to the bar charger table 200. In yet other example forms, the loading platform can comprise a feeder or hopper element operative to automatically or manually load rebar rods onto the bar charger table 200. In some example forms, the feeder can be also controlled by the electronic control 276 thereby eliminating the need for an operator to interact directly with the rebar rods to reload the bar charger table 200.

In preferred forms, charger station 200 further comprises one or more alignment elements configured for guiding and limiting the lateral movement of the rebar rods across the longitudinal rollers 212. For example, a plurality of alignment elements 222-229 are hingedly secured to the support frame, as shown in FIGS. 2 and 4. Preferably, the alignment elements 222-229 are hingedly secured to the transverse rails 261-268 and in the path of the trolley 214. The alignment elements are configured to hang freely down from the transverse rails 261-268 and hinge freely as the trolley translates back and forth along the charging station 200. When the alignments elements 222-229 hang freely, their vertical edges act as a series of bumpers or guards along the path of the longitudinal rollers 212 preventing the rebar rod from sliding laterally off, or become otherwise laterally displaced, from the longitudinal rollers 212. However, the hinged alignment elements 222-229 are configured to pivot out of the path of the trolley 214 as the trolley translates back and forth along the charger station 200 during operation so that alignment elements 222-229 do not interfere with the translation of the trolley 214.

FIGS. 6-11 show the cage assembly table or station 300 according to an example form of the present invention. As shown in FIG. 1, cage assembly station 300 follows bar charger station 200 and is aligned therewith. In example forms, cage assembly station 300 is positioned such that one end of the cage assembly table abuts, or is placed near, the second, distal end of charger station 200, allowing unimpeded linear translation of the rebar rod R from the charger station 200 to the assembly station 300.

Cage assembly station 300 generally includes a support frame 310 including upright stanchions or legs 311-322. The support frame also includes longitudinal rails, such as longitudinal rails 323-326. Cross rails 327-336 extend between and connect the longitudinal rails 323-326. A plurality of axial rollers 341-346 are rotatably mounted to the cage assembly support frame 310. Axial rollers 341-346 are mounted longitudinally along the cage assembly station 300 and are configured for axial rotation about their longitudinal axes of elongation. Axial rollers 341-346 are further adapted for supporting a rebar cage including a plurality of rebar wire loops or spirals L upright along the length of the cage assembly table 300, as shown in FIG. 1.

Figure 9A:
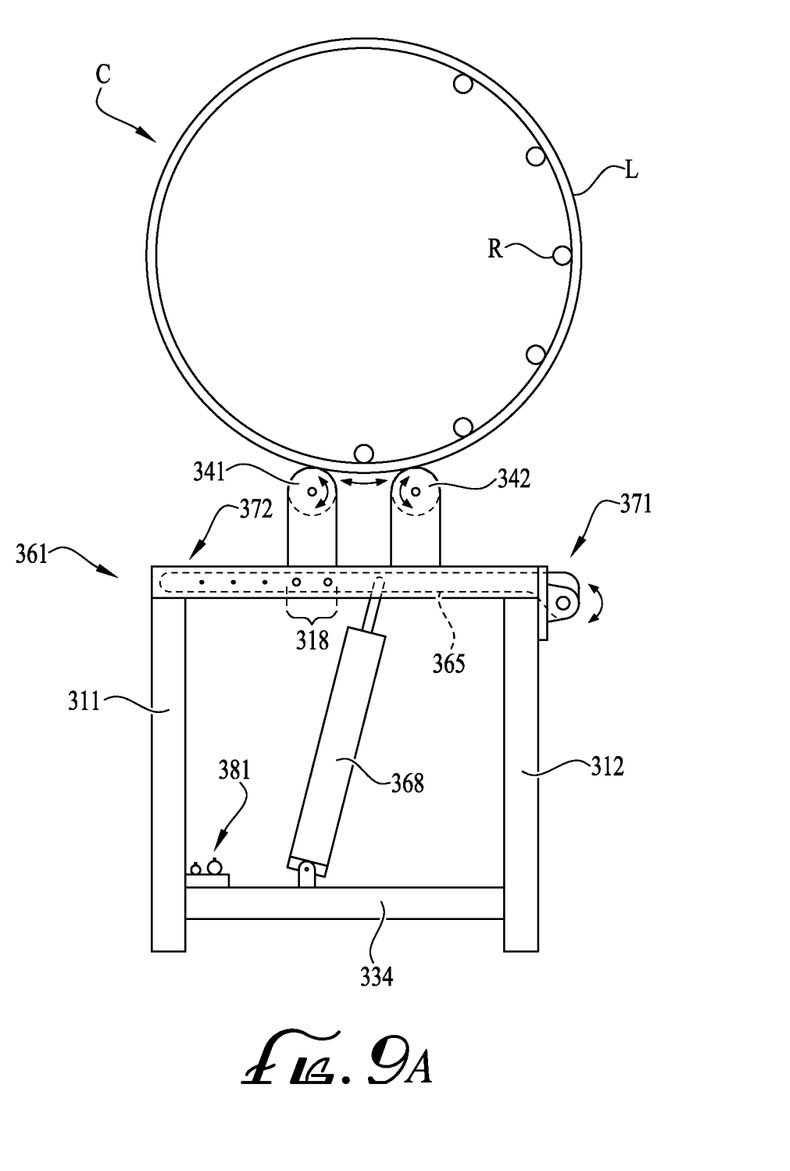
FIG. 9A is a schematic end elevation view of the cage assembly table of FIG. 6 shown with a partially assembled rebar cage.
Figure 9B:
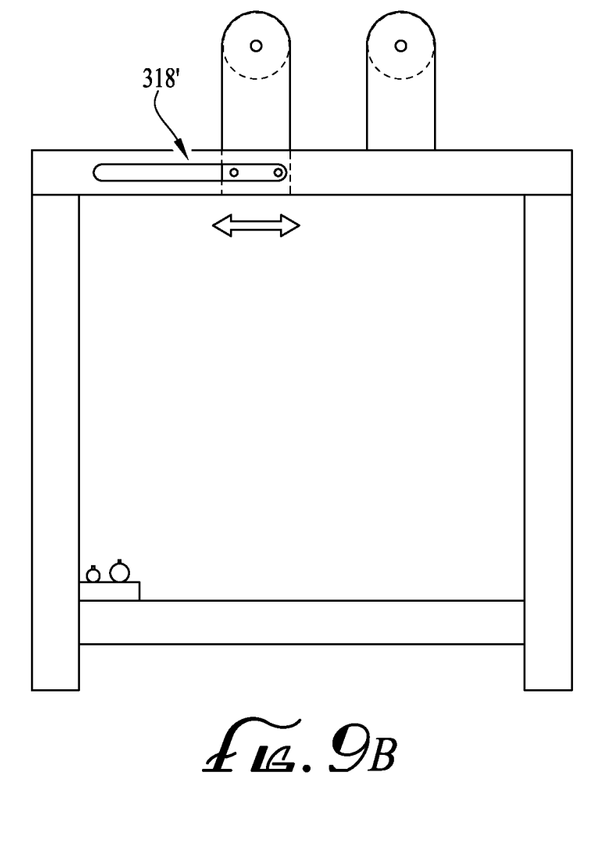
FIG. 9B is a schematic end elevation view of the cage assembly table of FIG. 6 showing an optional arrangement for adjusting the location of an axial roller of the cage assembly table.
Figure 9C:
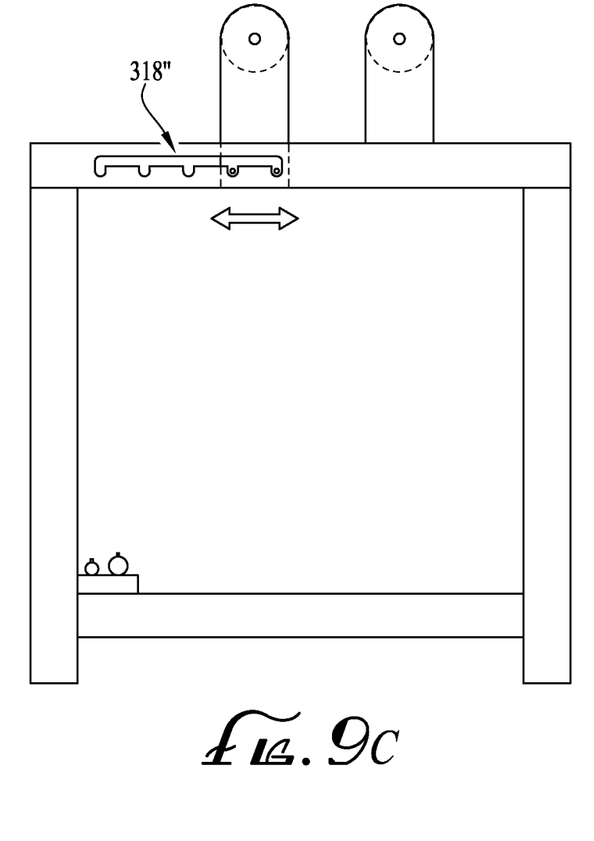
FIG. 9C is a schematic end elevation view of the cage assembly table of FIG. 6 showing another optional arrangement for adjusting the location of an axial roller of the cage assembly table.
Figure 10:
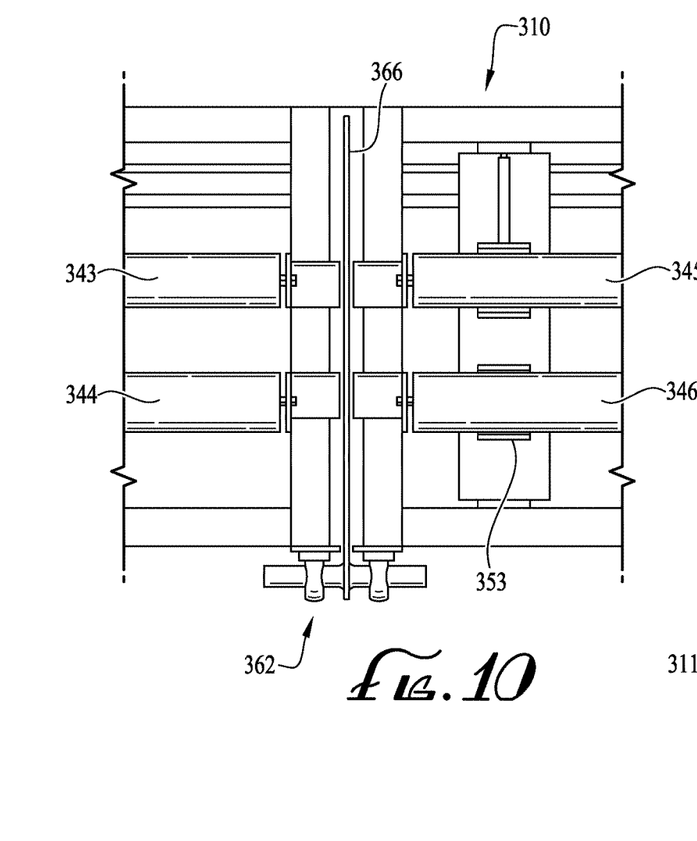
FIG. 10 is a detailed schematic plan view of a brake system and a discharge mechanism of the cage assembly table of FIG. 6.

According to an example form of the present invention, cage assembly station 300 comprises two rows of axial rollers (see 341, 342), as shown in FIGS. 9A-9C. The first row of axial rollers 342 is permanently mounted to a fixed point or location along the width of the cage assembly table whereas the position of the second row of axial rollers 341 is adjustable along the same. In the depicted form of FIG. 9A, second row of axial rollers 341 may be bolted, or otherwise secured, to the support frame 310 between multiple configurations or pairs of mounting points 370 along the width of the cage assembly station 300. The different configurations allow changing of the distance between the axial rollers 341-346 to accommodate rebar cages of various diameters. In other example forms, as shown in FIG. 9B, cage assembly station 300 features horizontal slots integrated to support frame 310 whereon the second row of axial rollers 341, 343, 345 are movably mounted along with mechanisms for locking the rollers in any desired position along the horizontal slot. In yet another example form, the cage assembly station 300 features horizontal slots with a plurality of vertical concavities or depressions for locking the position of the adjustable axial rollers 341, 343, 345 at predetermined configurations, as shown in FIG. 9C.

According to example forms, axial rollers 341-346 are driven or rotated by a roller drive mechanism or system 390. By rotating the axial rollers on which the rebar cage rests, the roller drive system allows an operator to rotate the rebar cage C on cage assembly table 300 without handling the cage directly. In example forms, the roller drive system 390 is controlled by an electronic control element 376. In some example forms, cage assembly station 300 may not comprise a roller drive system but still allows one or more operators to rotate the rebar cage on the axial rollers manually.

Optionally, assembly station 300 can further comprise an alignment element or component (not shown) for aligning the elongate rebar rods R with connection points along the rebar cage loops L. In example forms, the alignment component can comprise a funnel-like element and is movably mounted to the cage assembly table. Preferably, the alignment component is secured at the end of the assembly station 300 nearest to the bar charger station 200. In some forms, one or more alignment elements may be provided along the assembly station 300 to maintain linear translation of the rebar rod across the assembly station and minimize the risk of the rebar rod being dislodged.

Cage assembly station 300 further comprises brake elements 351-353 provided under axial rollers 341-346 to stop or prevent any unwanted rotation of the rebar cage during assembly. In example forms, brake elements 351-353 comprise rubber pads which are raised by pneumatic or power cylinders to apply braking pressure and/or friction to the axial rollers. In other forms, brake elements 351-353 comprise other suitable means and/or materials for applying friction to slow or stop the axial roller rotation.

Figure 6:
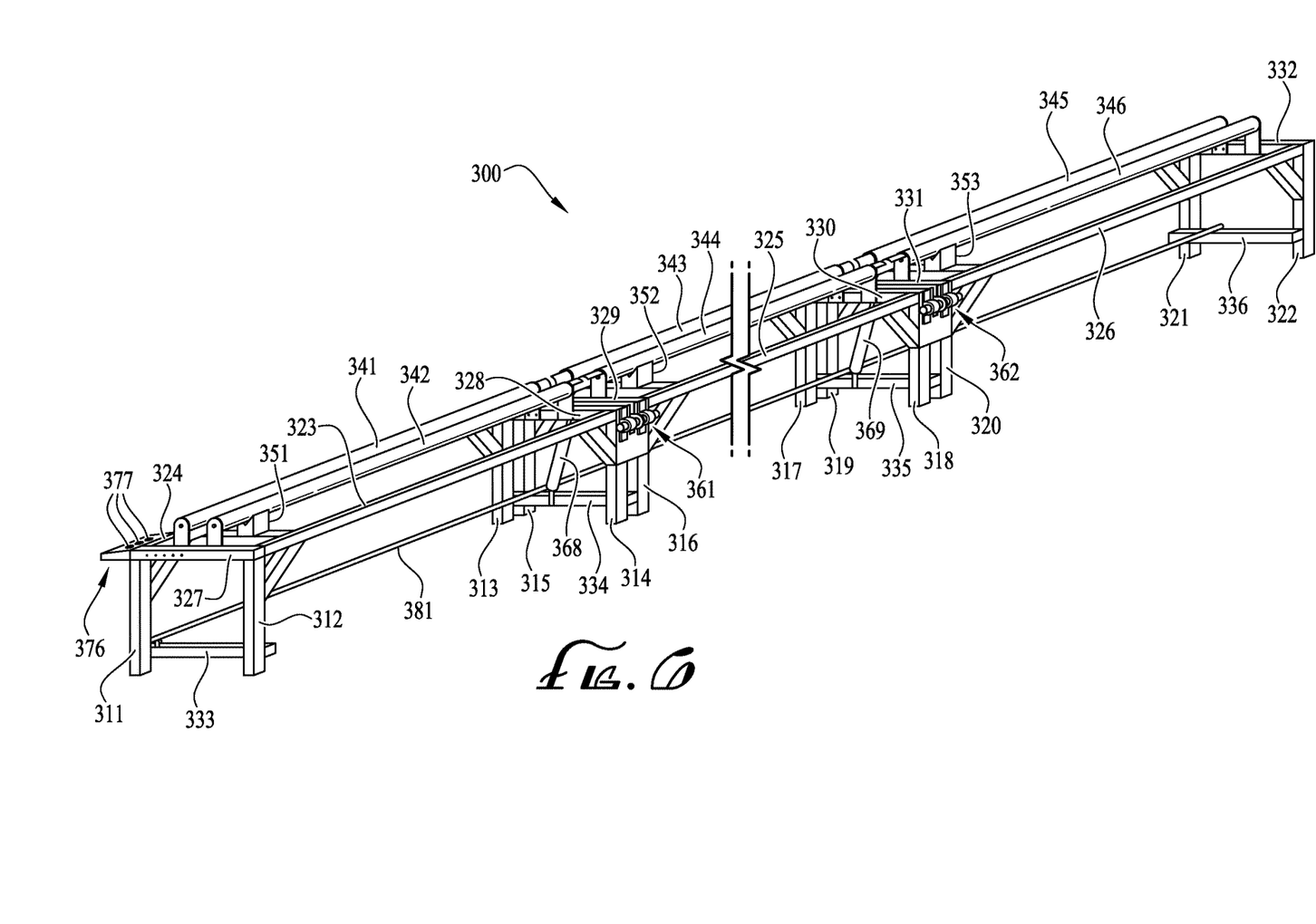
FIG. 6 is a schematic perspective view of a cage assembly table portion of the rebar cage assembly machine of FIG. 1.
Figure 7:
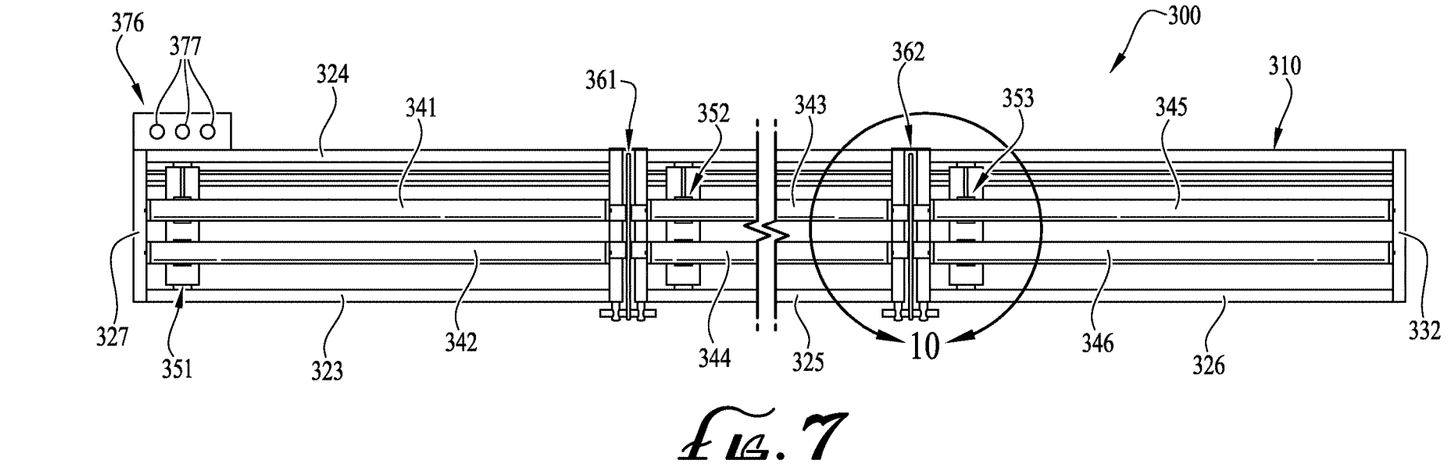
FIG. 7 is a top (plan) view of the cage assembly table of FIG. 6.
Figure 8:
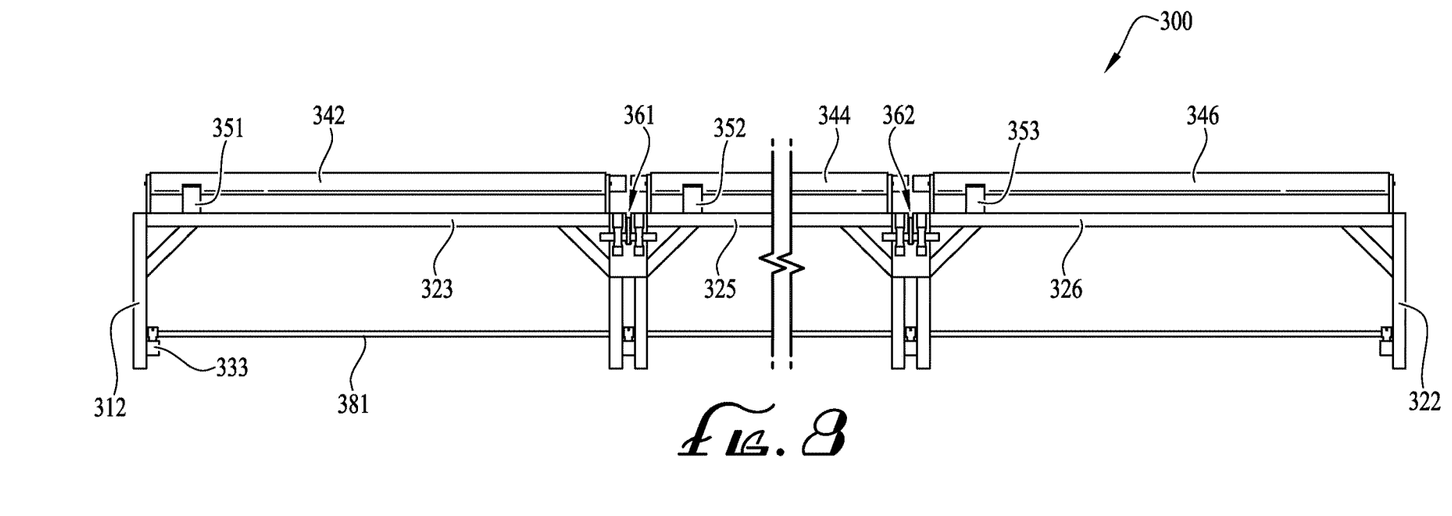
FIG. 8 is a schematic side elevation view of the cage assembly table of FIG. 6.
Figure 11:
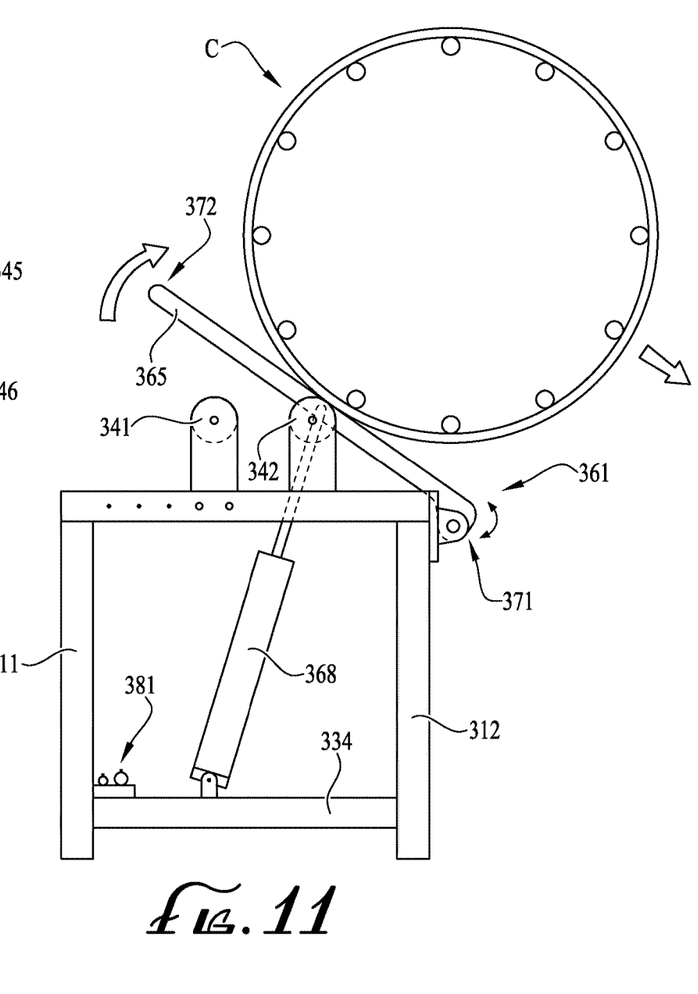
FIG. 11 is a schematic end view of a discharge mechanism engaged to remove a finished rebar cage from the cage assembly table of FIG. 6.
Figure 12:
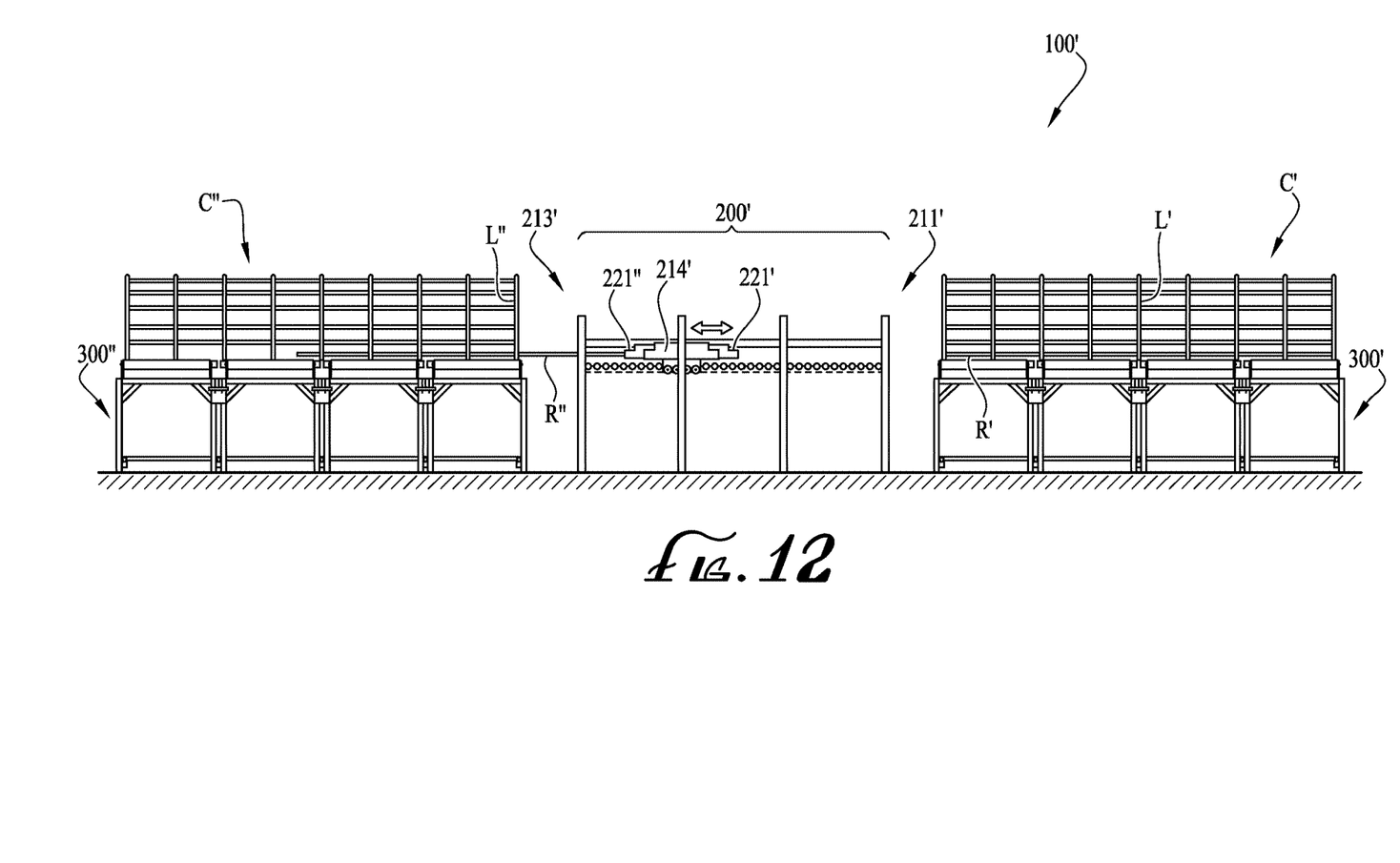
FIG. 12 is a schematic side elevation view of the cage assembly table according to another example form of the present invention.

Cage assembly station 300 further comprises one or more discharge or lift mechanisms 361, 362 for discharging or removing rebar cages from the assembly table once fully assembled. According to example forms of the present invention, lift mechanisms or systems 361, 362 comprise cams or lever arms 365, 366 and power or pneumatic cylinders 368, 369, as best shown in FIGS. 6, 9A and 11. In example forms, lever arm 365—having a first end 371 and a second end 372—is hingedly connected to the support frame 310 at its first end 371. Between its first and second ends 371, 372, lever arm 365 is supported by a power or pneumatic cylinder 368 secured to the cross rail 334. Pneumatic cylinder 368 is controlled by electronic controls 390 operative to control the actuation of the pneumatic cylinders and, thereby also, the lifting of the second, unsecured ends 372 of lever arms 365, 366. When pneumatic cylinders 368 and 369 are actuated or extended, flip lever arms 365 and 366 are hingedly raised forming a sloped plane and urging the rebar cage to roll off the cage assembly table 300. In some example forms, one or more ramps 390 are provided adjacent to the cage assembly table 300 to guide the rebar cages once they are rolled off the assembly table.

Case assembly station 300 further comprises air lines or hoses 381 for supplying pressurized air, or gas, to actuate the pneumatic cylinders in braking systems 351-353 and discharge systems 361 and 362. The assembly system 300 may comprise a closed air system or connect to an external air supply. In example forms, air lines 381 are secured along the base of support frame 310 and comprise a plurality of emergency air release valves or switches for releasing pressure when necessary to avoid unwanted operation of any pneumatic cylinder.

In some forms of the present invention, a centralized electronic control system or mechanism is provided to allow an operator to control all or some of the operable components, such as for example the trolley motor system, axial roller motor system, rod feeder system, and/or cage lift mechanism. In other forms, one or more control elements may be configured for wireless operation of the various systems.

FIG. 11 shows yet another example form of the present invention. According to the depicted form, rebar cage assembly machine 100' comprises two cage assembly stations 300' and 300" with the first cage assembly station 300' aligned to a first, proximal end 211' of the charging station 200' and the second cage assembly station 300" aligned to the second, distal end 213' of the charging station. By providing two cage assembly stations, rebar cage assembly machine 100' allows operators to assemble two rebar cages C simultaneously. The trolley 214' includes U-shaped rebar rod receptacle portions or pockets 221' and 221" at each of its two ends. The two receptacle portions 221', 221" are configured for receiving and securing an end of a rebar rod during the trolley's translational motions in both directions. For example, when the first rebar rod R' is completely driven across a first series of rebar loops L' on the first assembly station 300', the charging station is reloaded with a second rebar rod R" for driving the second rebar rod across the second assembly station 300". While the second rebar rod R" is being driven across a second set of rebar loops L" on the second assembly station 300", operators work to secure the first rebar rod R' to the first set of rebar loops L'. This process is repeated until the two rebar cages C' and C" are fully assembled as described above.

Those skilled in the art will appreciate that the cage assembly machine can be operated in a manner to load (charge) all of the rebar rods into a cage assembly all at once in one stroke or movement. It will also be appreciated that the cage assembly machine can be operated to load or charge one rebar rod at a time or a smallish number of rebar rods at a time, as desired.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. An apparatus for assembling rebar cages, comprising:
   one or more support frames extending along a first lengthwise axis;
   a plurality of axial rollers mounted to at least one of the one or more support frames for rotatably supporting a cylindrical wire cage for axial rotation about an axis of elongation, wherein the plurality of axial rollers are aligned substantially parrallel to that first lengthwise axis;
   a carriage movably mounted to at least one of the one or more support frames for translation, wherein the carriage is operable to drive an elongate rebar rod in a first axial direction parallel to the first lengthwise axis;
   a drive mechanism mounted to the one or more support frames for driving the carriage in translation back and forth between a retracted position and an extended position; and
   a control element for controlling operation of the drive mechanism, the apparatus being operative to allow an operator or worker to load an elongate rebar rod with the carriage in its retracted position, to allow the operator or worker to rotate the wire cage to a position to allow a rebar rod to be aligned to a predetermined rotational position about the wire cage, and to allow the operator or worker to control the translation of the carriage to cause the elongate rebar rod to be inserted into the wire cage.

2. An apparatus as claimed in claim 1 wherein the carriage comprises a receiver portion for capturing an end of the elongate rebar rod.

3. An apparatus as claimed in claim 1 wherein the carriage is supported by a plurality of longitudinal rollers aligned substantially perpendicular to the first lengthwise axis, the carriage being carried above the longitudinal rollers.

4. An apparatus as claimed in claim 1 wherein the one or more support frames comprise a first support platform for supporting the wire cage and a second support platform for supporting the carriage.

5. An apparatus as claimed in claim 1 further comprising a ramp for lowering the wire cage and a transfer mechanism operable for moving the wire cage onto the ramp to allow the wire cage to roll off the apparatus.

6. An apparatus as claimed in claim 5 wherein the transfer mechanism includes a cam and a power cylinder for operating the cam to lift the wire cage off of the axial rollers and to urge the wire cage onto the ramp.

7. An apparatus as claimed in claim 1 wherein the one or more support frames include a shelf for storing a supply of elongate rebar rods for insertion into a wire cage.

8. An apparatus as claimed in claim 1 wherein the carriage is driven back and forth by a drive chain.

9. An apparatus as claimed in claim 8 wherein the drive chain is driven by an electric motor.

10. An apparatus as claimed in claim 1 further comprising one or more alignment elements for aligning and guiding the elongate rebar rod during its translation.

11. An apparatus as claimed in claim 10 wherein the one or more alignment elements are hingedly attached to the one or more support frames and configured to prevent the rebar rod from becoming dislodged from the apparatus without interfering with the translation of the carriage.

\* \* \* \* \*